United States Patent
Siegmund

(10) Patent No.: US 9,212,500 B2
(45) Date of Patent: Dec. 15, 2015

(54) DEVICE AND METHOD FOR WIND LOSS PREVENTION

(71) Applicant: Stefan Siegmund, Dresden (DE)

(72) Inventor: Stefan Siegmund, Dresden (DE)

(73) Assignee: Stefan Siegmund, Dresden (DE)

( * ) Notice: Subject to any disclaimer, the term of this patent is extended or adjusted under 35 U.S.C. 154(b) by 55 days.

(21) Appl. No.: 14/261,647

(22) Filed: Apr. 25, 2014

(65) Prior Publication Data

US 2014/0311049 A1    Oct. 23, 2014

(51) Int. Cl.
*E04B 7/00* (2006.01)
*E04H 9/14* (2006.01)
*E04D 13/00* (2006.01)
*E04H 15/02* (2006.01)
*E04H 15/62* (2006.01)

(52) U.S. Cl.
CPC ........ *E04H 9/14* (2013.01); *E04D 13/00* (2013.01); *E04H 15/02* (2013.01); *E04H 15/62* (2013.01)

(58) Field of Classification Search
CPC ............... E04H 9/14; E04H 9/00; E04H 9/16; E04H 15/62; E04H 15/02; E04D 13/00
USPC .................... 52/23, 84, DIG. 11, 12
See application file for complete search history.

(56) References Cited

U.S. PATENT DOCUMENTS

| | | | |
|---|---|---|---|
| 5,522,184 A | 6/1996 | Oviedo-Reyes | |
| 5,579,794 A * | 12/1996 | Sporta | 135/88.01 |
| 5,819,477 A | 10/1998 | Gaffney | |
| 6,453,621 B1 * | 9/2002 | Bundy et al. | 52/3 |
| 6,865,852 B2 * | 3/2005 | Gower | 52/222 |
| 7,392,620 B1 * | 7/2008 | Watson, Jr. | 52/4 |
| 7,827,739 B2 * | 11/2010 | Graf | 52/84 |
| 2005/0166468 A1 * | 8/2005 | Pierce | 52/23 |
| 2007/0000183 A1 * | 1/2007 | Logan | 52/3 |
| 2007/0022672 A1 * | 2/2007 | Bachynski | 52/90.1 |
| 2008/0040981 A1 * | 2/2008 | Lindstrom | 52/30 |
| 2008/0083169 A1 * | 4/2008 | Sicurella | 52/4 |
| 2012/0090249 A1 | 4/2012 | Schor et al. | |

* cited by examiner

*Primary Examiner* — Mark Wendell

(57) ABSTRACT

A loss prevention device, method and system for a structure subject to aerodynamic lift upon exposure to a wind event is disclosed having at least one tensioner coupled to the structure, at least one anchor attached to a fixed surface, and at least one barrier semipermeable to airflow connected between the at least one anchor and the at least one tensioner and exposed to said wind event. A fraction of a wind energy of said wind event is divided between the structure and the barrier, such that a lift force induced in the structure by the wind energy is at least partially counteracted by a strain induced in the barrier by the wind energy.

17 Claims, 5 Drawing Sheets

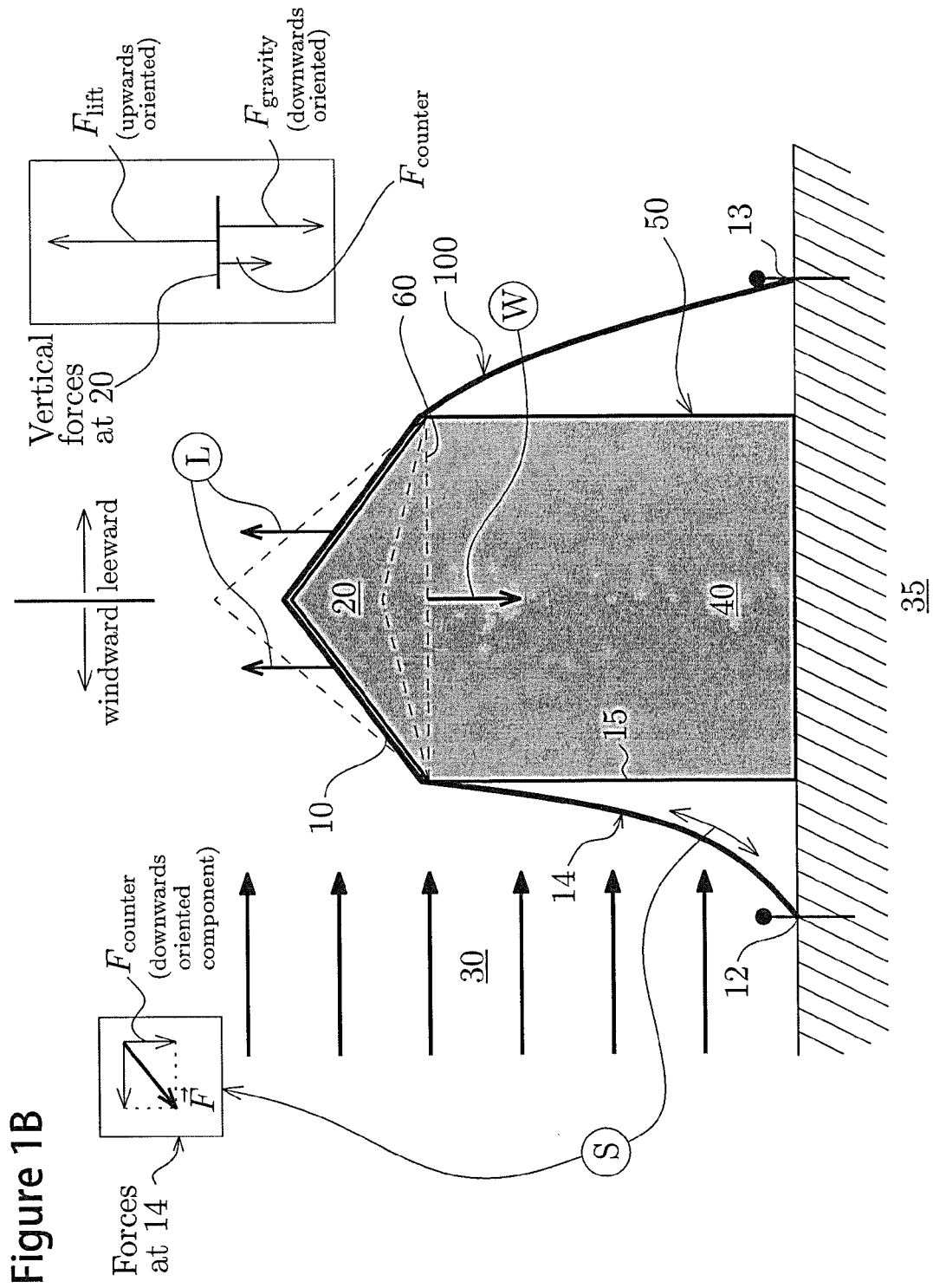

Figure 4
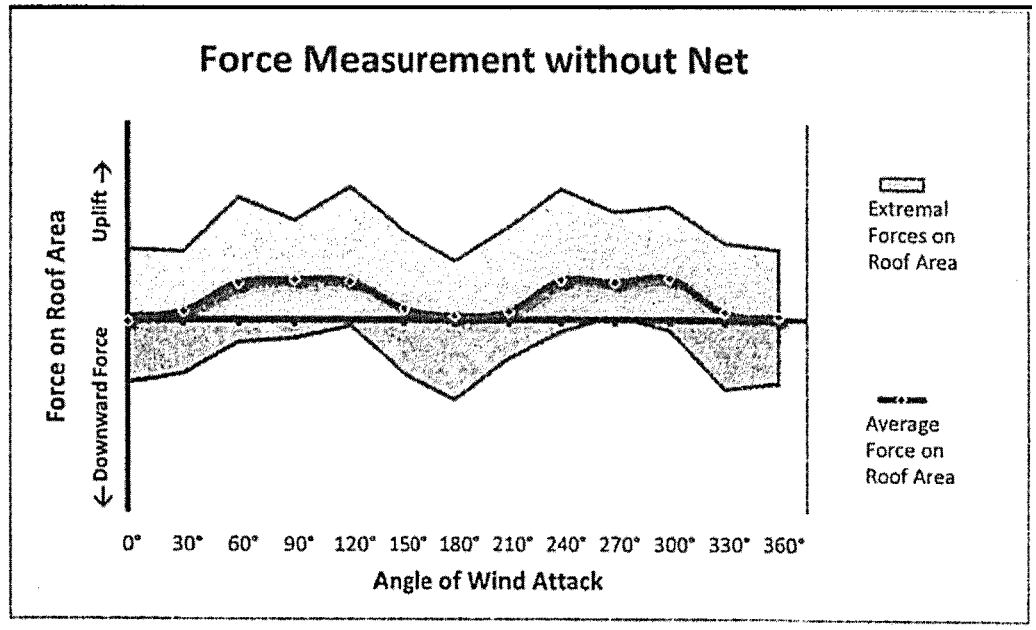
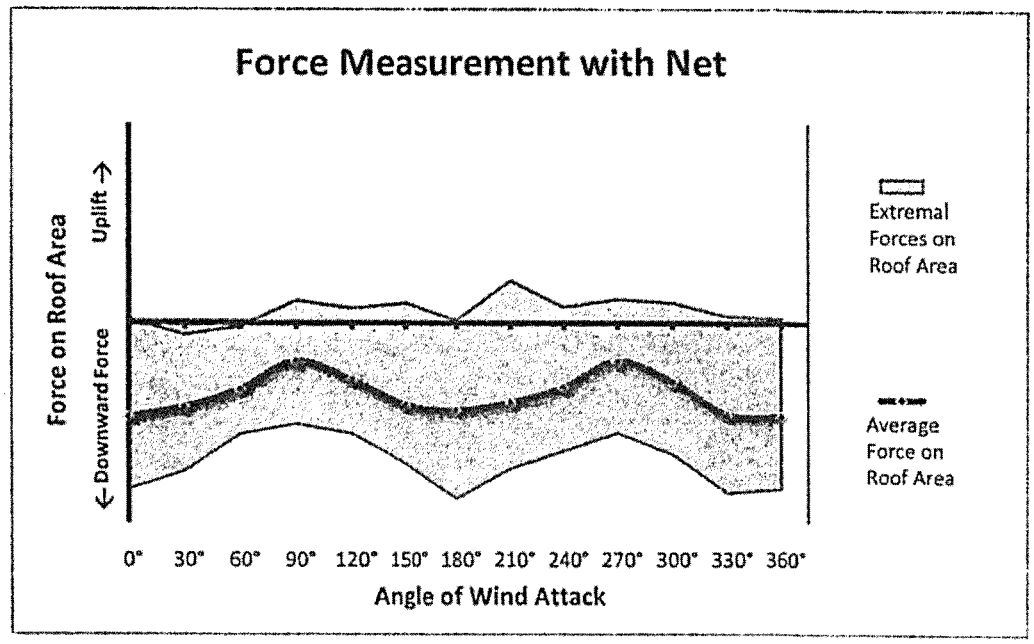

DEVICE AND METHOD FOR WIND LOSS PREVENTION

TECHNICAL FIELD

Various embodiments relate generally to a device and method for protecting structures from damage due to severe weather. More particularly, the various embodiments are related in part to protecting commercial or residential buildings from losses due to structural failure caused by wind.

BACKGROUND

Meteorological wind events, such as those caused by storms including cyclones, which cyclones may commonly be referred to as tropical storms, tropical depressions, typhoons and/or hurricanes, depending on region, size, and/or intensity are well known to generate specific wind conditions that are damaging to structures, including residential and commercial buildings. More generally, strong winds may form as a result of other types of severe weather, including storms generating gale-force or stronger winds that may also cause structural damage, depending upon specific conditions. Additionally, more localized severe wind events, such as tornadoes, may be spawned by the above conditions and events which may be expected to cause significant property damage due to wind intensity, direction, and duration over the course of the event.

Wind events may have varying degrees of predictability, depending on the conditions and circumstances that lead to their development. For example, forecasting the movement, track, size and strength of a typical tropical cyclone has improved to the point where a reliable three-to-five day warning can be issued regarding a reasonable probability of landfall in a particular area. Of course, as the storm approaches, the accuracy of the prediction improves. By contrast, events such as tornados are typically far less predictable. To the extent that hurricanes may predictably spawn tornados, the forecasting of any individual tornado remains elusive.

Wind damage to buildings is quite common after gale-force winds. Strong winds cause damage to buildings in a variety of ways, however one known phenomenon is often responsible for the shearing off of a building roof. In particular, horizontal winds resulting from storms such as a hurricane may cause aerodynamic lift on a roof, causing it to separate from the rest of the structure. Lacking the protection of a roof structure, complete destruction of the building may result. Wood-frame construction standards common in the United States are thought to be particularly susceptible to wind damage. Elevated construction requirements have been proposed for, or in place, in certain regions at high risk of storm damage, however even homes or commercial buildings built using other materials such as concrete masonry units are likely to lose their roof in a hurricane, particularly when the roof is engineered of wood.

Previous attempts to ameliorate the risk of storm event related wind damage have concentrated on holding a roof in place using belts, ropes or meshes, anchored to the ground or foundation of the underlying structure. These devices are characterized by the static force applied to hold the structure together. Static load on roof, straps, ropes and anchors are higher than needed for the protection of the roof when there is no significant wind, and may be lower than required when gusts of strong wind apply, producing among other impacts, strong uplift on the roof.

As a consequence, most of the time the load on the system is higher than necessary, while in moments of especially strong winds, protection of the building is possibly insufficient. This leads to situations where a building may be damaged by wind despite the protection measures, or instead where the roof may be subject to long periods of overstress.

SUMMARY

An apparatus for protecting buildings and objects from the destructive forces of strong winds such as hurricanes and the like by redirecting wind forces during storm periods is disclosed. A barrier or foil, such as a mesh covers, for example, 50-90 percent of the building and may be part of a harness which is anchored to the ground. The mesh or other permeable or semi-permeable or array of impermeable material interspersed with gaps acts in the aggregate as a semipermeable membrane or barrier to high winds. When the wind hits the mesh, or other material between the roof and the ground, the wind load on the mesh or material, depending on its permeability, is only a fraction of the full wind. The anchored harness redirects this fraction of the full wind load by pushing the upper part of the building downwards. This counterforce neutralizes the strong uplift forces caused by the strong winds which blow over the roof.

FIG. 4 illustrates the average effect of such a system on the roof of a structure. As shown, when the disclosed apparatus is deployed prior to a storm, downward force is increased, varying directly with increases in uplift (which serve as a proxy for wind energy exposure). The dynamic variation in downward force has a net effect of reducing uplift forces on the roof, which may be trimmed to keep forces on a roof within a specified range despite extreme variations in wind speed and direction.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 1A to FIG. 1B show cross sections the deployment of a device of the present disclosure on a building;

FIG. 4 shows forces on a roof as a function of wind direction with and without the device of the present disclosure deployed.

DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The words windward and leeward, respectively are used to describe the orientation of an object, such as a building, relative to the wind, with the windward side facing the wind, and the leeward side facing away from the wind. It is explicitly intended throughout that windward and leeward be defined by the direction of the wind, with the result that the part of the object or building facing into the wind is considered windward, and that the same part of the object or building is considered leeward when facing away from the wind following a change in wind direction.

By way of example, as disclosed, anchors are embedded in the ground. The harness is stored until needed. When a hurricane warning is issued, the harness is installed. The harness covers the building; it is connected to the anchors in the ground and may consist of individual mesh panels which can be installed consecutively. An individual mesh panel may be installed as follows: First, a ball with a thin cord attached is hit with a racquet over the roof to the other side of the building. In a second step, the mesh panel is pulled over the roof by pulling on the thin cord. Once all individual mesh panels are connected and tied to the anchors, the harness is in place. The harness can be removed easily after the hurricane is over.

When strong wind hits the anchored harness from the side, a fraction of the wind load is taken over by the semipermeable membrane which is part of the harness. This partial wind load tightens the anchored harness and is transferred to the harness-covered roof. The angle ($\phi$) between the harness and the ground depends on the conditions of the property on which the building is located. The greater the distance (d) between an anchor and a wall, the smaller is the angle $\phi$ between the harness and the ground. The angle $\phi$ should be larger than the pitch of the roof ($\rho$) to guarantee that the harness fits closely to the roof. The difference $\phi$-$\rho$ between those two angles should not be too large to ensure that the dynamic load which is applied to the roof by the harness is distributed equally and not focused on the edge areas of the roof. The semipermeable membrane is a net or mesh material, or any other material with a predetermined or definite wind permeability which is chosen so that under the condition of strong side wind, the fraction of wind load taken by the harness equals in size the average uplifting wind forces created by the wind blowing over the roof.

Figure 1A:
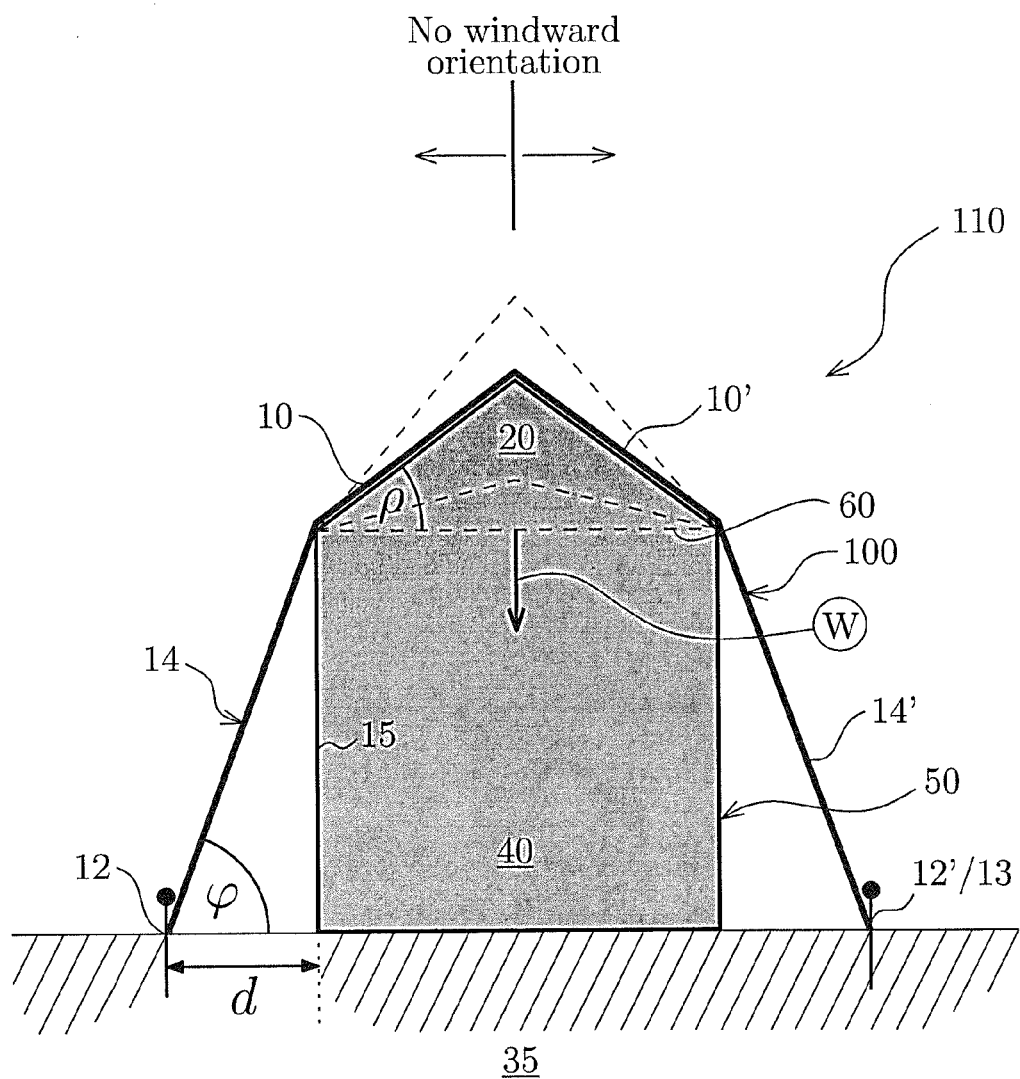

FIGS. 1A and 1B show a loss prevention device according to an aspect of the disclosure. More particularly, an embodiment of a loss prevention device 100 for a structure subject to aerodynamic lift upon exposure to a wind event is shown. Loss prevention device 100 includes at least one tensioner 10 coupled to structure 20. The coupling may be by fastener, adhesive, or by gravity, as shown. Structure 20 has a weight, W.

Anchor 12 is attached to a fixed surface, in this case in the ground 35. As shown anchor 12 may be a stake or pin driven into the ground, or it may be a permanent or semi-permanent, installation, including a subsurface anchor having a connection point near the surface that may be safely covered when not in use. A barrier 14, which may be semipermeable to airflow is connected between anchor 12 and tensioner 10. As shown in FIG. 1A, device 100 exerts no relevant forces on structure 20 in the absence of wind. There is no aerodynamic lift applied to structure 20, and barrier 14 is held in position.

As shown in FIG. 1B, barrier 14 may be exposed to wind 30. During a storm or other wind event, a fraction of the energy carried by wind 30 is divided between structure 20 and barrier 14. Strain S is induced in barrier 14 causing a force $\vec{F}$ to develop as illustrated in the callout in FIG. 1B. Simultaneously, a fraction of the energy carried by wind 30 acts on structure 20, providing lift L, as shown. Lift L acts in opposition to the weight W of structure 20 (as well as the weight, however small, of objects on or attached to the roof, including but not limited to device 100 itself) due to gravity. As shown in the callout, the forces on structure 20 therefore are lift L in the upward direction, designated $F_{lift}$, and forces exerted as a product of weight W by gravity, designated $F_{gravity}$. Force $\vec{F}$ is also shown acting on structure 20. The downward component of force $\vec{F}$ ($F_{counter}$), derived from strain in barrier 14, and applied at tensioner 10 at least partially counteracts $F_{lift}$ in structure 20 through interaction of structure 20 via coupling with tensioner 10.

Accordingly, the lift, generally indicated as L, or more specifically as lift force $F_{lift}$, induced in structure 20 by the energy of wind 30 is at least partially counteracted by a strain S induced in the barrier 14 by the wind energy. This acts to prevent structure 20 from damage during the storm.

Wind events may include hurricanes, tornados and other cyclonic activity including tropical storms and tropical depressions, typhoons and twisters. In many cases wind events may be reliably predictable days in advance. For example a hurricane watch may issue several days, and a hurricane warning 2-3 days in advance of landfall. Such a wind event is referred to herein as a predictable wind event. For purposes of this disclosure, advance warning of the approach of a wind event, or storm, is relevant as it may provide time to construct or install protection device 100 on structure 20.

As discussed immediately above, at least a component of strain S at tensioner 10 produces a counterforce ($F_{counter}$) which is opposed in direction to said lift force. Counterforce $F_{counter}$ may increase as wind strength increases. Increases in wind strength likewise increase lift L induced in structure 20 with the result that lift force $F_{lift}$ increases. Accordingly, over a range of wind speeds, or a range in wind energy, $F_{counter}$ may be proportional to the lift applied to structure 20.

Although structure 20 may be any structure, building or part thereof that is subject to lift, and more particularly subject to damage, it is commonly the case that roofs of residential and commercial buildings are susceptible to damage by separation from the rest of the building due to extreme weather. According to an embodiment of the present disclosure, device 100 may be applied to prevent damage to the roof of a residential or commercial building. The roof may be flat, or have a peak or pitch.

In the event that the structure 20 subject to aerodynamic lift for which device 100 of the present disclosure is to prevent loss is a building roof, specific characteristics of the roof structure are relevant to the operation of device 100. In particular, the lift force for which device 100 is to protect structure 20 is a net lift force ($F_{net}$). The net lift force takes into account the downward force exerted on structure 20, by gravity. In the case of a roof, the weight of the roof will tend to resist lift. Accordingly, net lift force may be calculated according to the formula $F_{net}=F_{lift}-F_{gravity}$ where $F_{lift}$ is the total aerodynamic lift on said roof, and $F_{gravity}$ is the force due to the weight of said roof. Thus, the total force exerted by aerodynamic lift that would tend to overcome the dead weight of the roof and begin to pull it upward may be referred to as $F_{net}$. As long as $F_{net}$ is negative, the roof is in no danger of damage due to the effect of wind. When $F_{net}$ has a positive value, structure 20 may be said to be unstable, and will remain in place only if otherwise fastened to a fixed surface.

The counterforce $F_{counter}$ is intended to counteract lift on structure 20. More particularly, counteracting net lift may be of particular importance in reducing or preventing losses from wind damage, as lift below the weight of the roof may not present any risk of loss. To provide a dynamic counterforce, it may be beneficial, for example, to orient barrier 14 in a manner that will tend to cause $F_{counter}$ to vary in magnitude in proportion to the wind speed applied to the roof. For example, as shown in FIG. 1B, wind 30 applies to both barrier 14 and structure 20. Increases in wind strength would therefore tend to increase counterforces at the same time as increased lift is induced in the roof structure. It may thus be said that a positive correlation exists between the magnitude of lift on the roof and the counterforce, in the opposite direction. To the extent an embodiment of the present disclosure provides that $F_{counter}$ is proportional to the lift exerted on structure 20, it may be proportional to one or both of $F_{lift}$ and/or $F_{net}$.

Storms, including cyclonic storms such as hurricanes, are known to produce winds that rapidly and dramatically change direction. However, at any one moment during a storm, wind may blow on a structure in one direction. That direction may be considered to give roof structure 20 a windward and a leeward side. The orientation by these references is helpful, as the development of lift in roof structure 20, and the corresponding counterforces in device 100 depend at least in part on the orientation into, or facing away from oncoming wind 30.

In FIGS. 1A and 1B, tensioner 10 is shown in cross-section extending across the peak of structure 20, which is illustrated as a roof on building 50. The function of tensioner 10 is to couple the forces generated by the anchored barrier 14 to roof, or structure 20. This coupling permits counterforce $F_{counter}$ to perform its function to counteract lift in structure 20. According to a further embodiment of the present disclosure, however, this coupling may take the form of a single cable, belt or other member, or may be composed of a plurality of members.

Figure 2:
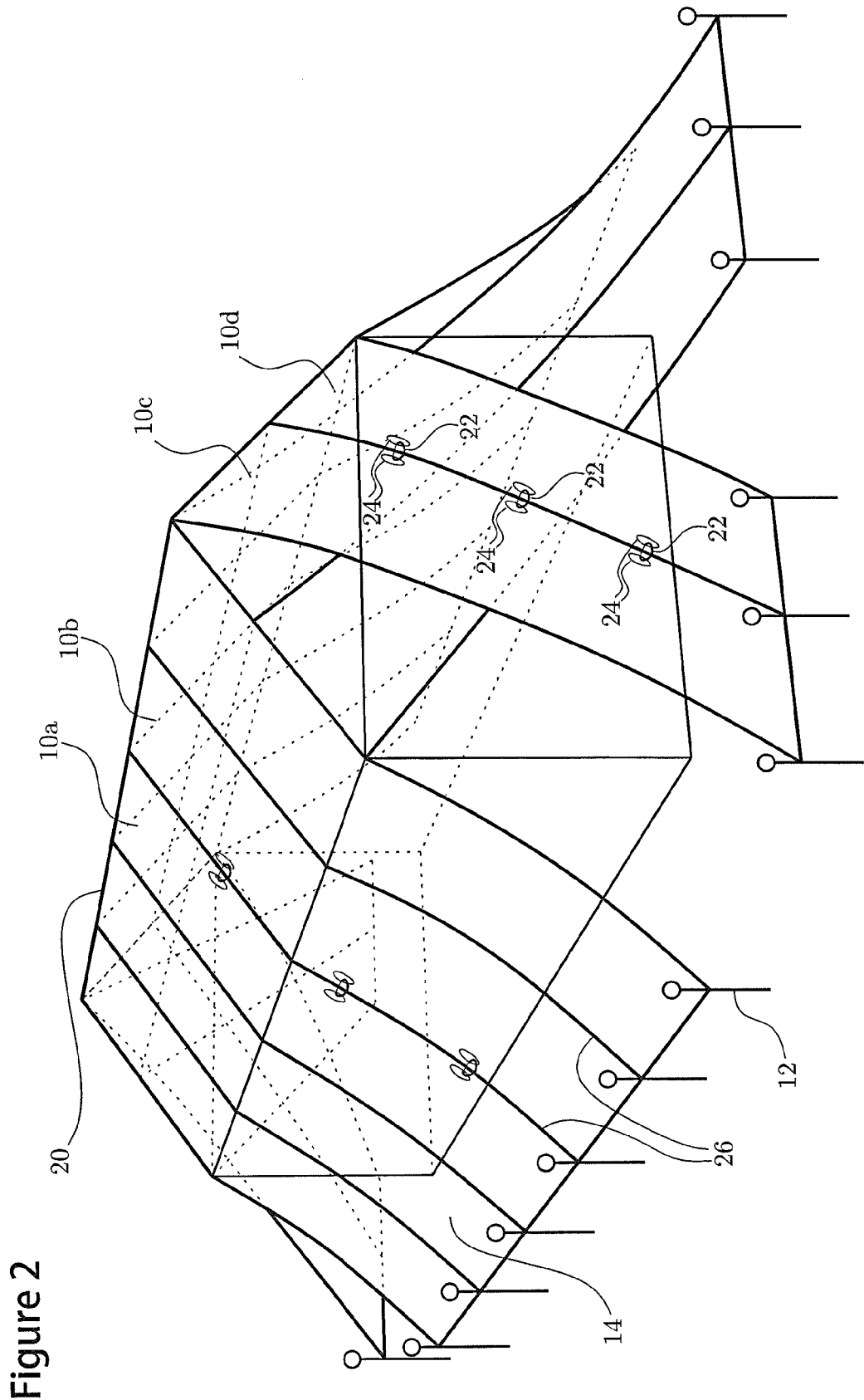
FIG. 2 shows a perspective view of an implementation of an embodiment of the present disclosure.

An advantageous aspect of multiple elongate members positioned across a surface of the roof structure 20 would be to distribute forces across a wider area, and to limit potential damage to the roof due to dynamic or static overstresses. FIG. 2 shows a plurality of elongate members 10a-10d functioning as tensioners 10, their belt-like profile advantageously distributing forces generated by anchored barrier 14 onto the frame of roof structure 20. Alternately, a plurality of elongate members may be joined by connectors to a single barrier, similarly providing a distributed load of counterforces onto roof structure 20.

According to a further embodiment, connectors may take the form of carabiners 22.

According to a further embodiment, one or more elongate members 10a-10d may be formed of cables, or woven belts. In the case of woven belts, grommets 24 may be provided to reinforce the interface between elongate members 10a-10d and carabiners 22.

FIG. 1A discloses device 100 installed on a building 50 with no wind indicated. In wind calm circumstances, there is no windward orientation. Anchor 12 and anchor 12' are oriented symmetrically, and serve to hold barriers 14 and 14' respectively in place with tensioners 10 and 10' in place, respectively.

FIG. 1B, on the other hand shows wind 30 approaching from the left side. Accordingly the left side of building 15 is the windward side. Anchor 12 may be referred to in this case as a windward anchor. According to an embodiment of the disclosure, at least one windward anchor may be used to secure barrier 14 (or in the event of wind approaching from the right, anchor 12' and barrier 14') for exposure to the wind 30.

Anchor 14 (or 14') may be embedded in a horizontal surface such as the earth or soil, or other substrate above, below or at grade level with the earth. A temporary stake may be advantageously used for this purpose, as it would permit removal of the anchor when device 100 is not installed. Alternatively, the anchor may be mounted on a wall of building 50.

As disclosed immediately above, the provision of an anchor on either side of building 50 may serve as windward anchor 12/12', depending on the prevailing wind. However, it is advantageous to provide an anchor on the leeward side of building 50. For example as shown in FIGS. 1A and 1B, a leeward anchor may serve to hold tensioner 10 in place above roof structure 10, via coupling with tensioner 10' and barrier 14'. This configuration, providing both a windward and leeward anchor serves multiple purposes.

Barrier 14 (or 14') may be made of a netted material and may have a predetermined permeability to wind. Alternately, barrier 14 may comprise a plurality of membranes such as barrier 14 as shown in FIG. 2. In a case where the membranes are less permeable, or are not permeable to wind, it may be advantageous to separate individual membranes with gaps 26, whereby the size of the gap may define the permeability of barrier 14 as a whole.

As discussed above, the aerodynamic lift induced in structure 20, such as the roof of building 50, must first overcome the force of gravity before posing a risk of damage to building 50 due to displacement of structure 20. Even after sufficient lift develops in structure 20 to overcome the force of gravity, structure 20 may still be held in place by mechanical connections between structure 20 and the rest of building 50. For example, a roof may be nailed to the walls of a home.

Moreover, as lift in structure 20 increases, approaching and eventually exceeding any mechanical connection between structure 20 and building 50, structure 20 will shear off at the weakest part of the interface between structure 20 and the remaining portions of building 50. The remaining portion may be referred to as a sort of leftover structure, shown in FIGS. 1A and 1B as intermediate structure 40.

In other words, intermediate structure 40 is what remains of building 50 after structure 20 has been torn off. The interface at which the separation occurs may be referred to as separation boundary 60. Separation boundary 60 defines the separate structures 20 and 40 that comprise building 50, even though the precise location of the boundary may not be known until the mechanical connection between structure 20 and intermediate structure 40 has failed, and the boundary can be observed.

Where structure 20 is a building roof, the roof may have a pitch defined by an angle ($\rho$) from horizontal as shown in FIG. 1A. Where the pitch is windward it may have an effect on the placement of anchor 12. In particular, anchor 12 may be positioned at a distance (d) such that an angle ($\phi$) between a horizontal surface (such as the ground) and barrier 14 is less than 90 degrees.

Advantageously, distance (d) is chosen to provide an angle $\phi$ that is somewhere between 90 degrees and angle $\rho$, which defines the roof pitch. If a distance d is chosen that results in $\phi<\rho$, barrier 14 may lift from the surface of roof/structure 20. According to an embodiment, anchor 12 may be located on a wall, such as windward wall 15. Such an anchor may protrude sufficiently to permit an angle $\rho<\phi<90°$. Alternately, as stated above, anchor 12 may be affixed to a horizontal surface windward of building 50.

Severe wind events are known to carry debris aloft. Configuration of the material, such as netted material, which forms barrier 14 to withstand, resist or even block flying debris. An additional advantage of the embodiments of the present disclosure including the ability of barrier 14 to at least withstand flying debris without changing the orientation of the barrier or displacing it relative to the wind, is that collateral damage to the walls, such as wall 15 of building 50 may be protected from storm damage to some degree by device 100.

FIG. 1A shows device 100 installed on building 50 in the absence of wind. Such a situation may be analogous to a pre-storm setup, wherein storm warnings have issued prior to the development of appreciable storm-related wind at the location of building 10. In order to hold device 100 in place in anticipation of use and operation during a forecasted storm, it is necessary to secure the components of device 100 relative to the building it has been deployed to protect. According to an embodiment of the present disclosure, this is achieved at least in part by pre-tensioning barrier 14. The particular tension applied may alternately be referred to as a pre-tensioning force or ($F_{pre}$), which is applied to be at least sufficient to hold said barrier in place relative to said structure when wind is absent, or when slight breezes and wind below storm force may apply.

It is to be understood that $F_{pre}$ is a static tension applied to device 100 during deployment. As such it will inherently contribute to the generation of a counterforce $F_{counter}$ applied to structure 20, particularly in the absence of wind. However, according to an embodiment of the present disclosure, $F_{pre}$ is deliberately kept below, and preferably well below a tension needed to counteract $F_{net}$ as $F_{net}$ approaches the magnitude necessary to detach structure 20 from intermediate structure 40.

As noted above, at least a component of the forces due to strain in the at least one barrier produces a counterforce ($F_{counter}$) opposed in direction to said lift force. Moreover, calculations regarding lift may consider that a lift force that is a net lift force ($F_{net}$), the net lift force being calculated according to the formula $F_{net}=F_{lift}-F_{gravity}$ where $F_{lift}$ is the total aerodynamic lift on roof/structure 20, and $F_{gravity}$ is the opposing force produced by the weight of the roof, and wherein $F_{counter}$ may vary directly, may be positively correlated or may be proportional to at least one of $F_{net}$ and $F_{lift}$ over at least certain ranges of wind conditions including speed and direction. As noted above, this correlation and/or proportionality, where it exists, is owed to the configuration of device 100, and more particularly to the character and orientation of barrier 14, trimmed to convert a fraction of oncoming wind energy into a dynamic counterforce that at least varies with wind strength.

Still further, separation boundary 60 between structure 20 and intermediate structure 40 may define an edge of structure 20, the structure being separable from intermediate structure 40 at separation boundary 60 when the net lift force $F_{net}$ is greater than a separation force which may alternately be referred to as $F_{sep}$. It is also consistent with an embodiment of the present disclosure to consider $F_{sep}$ to be defined at least in part by the ultimate strength of a mechanical linkage between structure 20 and intermediate structure 40.

In view of the above, it can be predicted that structure 20 will separate from intermediate structure 40 when the net lift (the total lift minus the effect of gravity) force $F_{net}$ exceeds $F_{sep}$. At this point, structure 20 can be expected to rip away from the parts of building 50 on the other side of the separation boundary, and continue away free of any mechanical connection, leaving intermediate structure 40 exposed to the storm.

According to an embodiment of the present disclosure, therefore, device 100 may prevent loss due to displacement of structure 20 when $F_{net}-F_{counter}<F_{sep}$. However, according to another aspect of the present disclosure, the direct relationship between $F_{counter}$ and wind energy impact serves to vary $F_{counter}$ directly or is positively correlated in magnitude to the applied wind, dynamically countering the similar direct relationship between wind energy and lift induced in structure 20 such that it does not exceed the force necessary to separate a structure such as a roof, from a building such as a residence.

As discussed above, the force used during deployment of device 100, to connect and hold barrier 14 in place relative to anchor 12 and tensioner 10 is a pre-tensioning force ($F_{pre}$). The ability of device 100 to generate increased counterforces as needed, and also to relieve those forces as wind abates, serves to protect structure 20 from wind damage due to aerodynamic lift. For this reason, a force ($F_{pre}$) that significantly exceeds a minimum necessary to keep the elements of device 100 properly positioned is simply not necessary. A therefore advantageous embodiment of the disclosure is a deployment which, in wind-calm conditions, has set force ($F_{pre}$) to a minimum value, or where it is at least insufficient to counteract a net lift force $F_{net}$ when $F_{net}>F_{sep}$.

By setting $F_{pre}$ to a minimum value, damage to structure 20 due to static tension is avoided. For example, roofs with asphalt shingles and aluminum gutters need not be stressed unduely prior to the arrival of a storm (or unnecessarily, such as where a storm never arrives).

Figure 3:
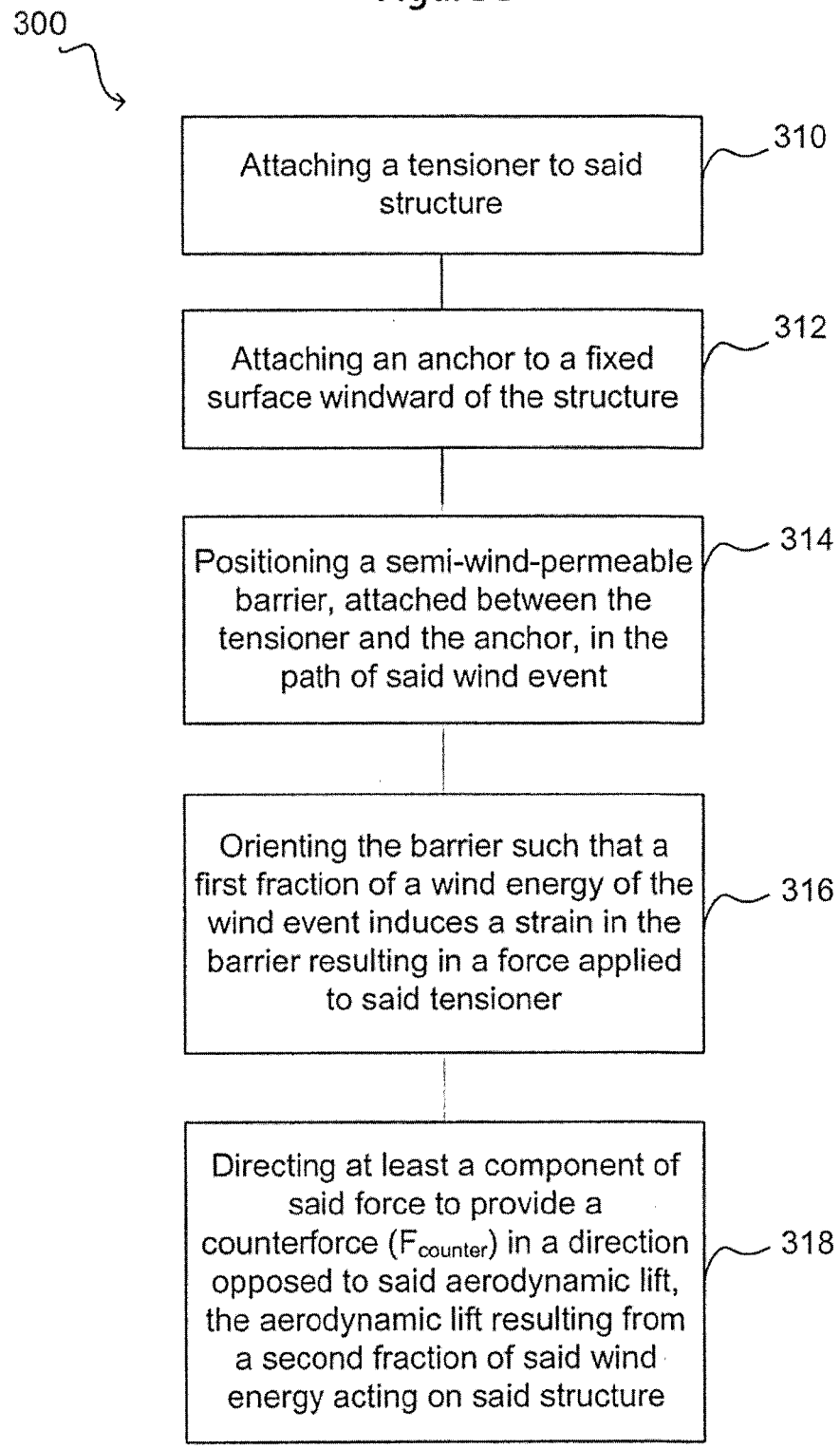
FIG. 3 shows a method according to an embodiment of the present disclosure.

An embodiment of the present disclosure shown in FIG. 3, referencing FIGS. 1A, and 1B herein includes a method 300 for counteracting aerodynamic lift in a structure during a wind event. The method includes 310 (attaching a tensioner 10 to structure 20), 312 (attaching an anchor 12 to a fixed surface 35 windward of structure 20), 314 (positioning a semi-wind-permeable barrier 14, attached between tensioner 10 and the anchor 12 in the path of said wind event), 316 (orienting the barrier such that a first fraction of a wind energy from wind 30 of the wind event induces a strain in barrier 14), 318 (directing at least a component of the force to provide a counterforce opposed to aerodynamic lift induced in structure 20).

According to a further embodiment of the present disclosure, the method may further include identifying a separation boundary of said structure and an intermediate structure, and attaching the anchor to said intermediate structure.

According to a still further embodiment of the present disclosure, $F_{counter}$ may be proportional to said lift force or may vary directly with said lift force, or may be positively correlated to said lift force.

According to a still further embodiment of the present disclosure, the structure may be a roof of a building.

According to a still further embodiment of the present disclosure an angle of attack (φ) is the angle between the barrier and a horizontal surface, and where φ is less than 90 degrees (and not less than the roof pitch defined by an angle (ρ) measured from a horizontal plane).

According to a still further embodiment of the present disclosure the method may further include, estimating a maximum wind energy based on a forecast of said wind event, calculating theoretical maximum lift force ($F_{maxlift}$) applied to said structure based on said estimate, determining a fraction of said maximum wind energy sufficient to at least prevent displacement of said structure due to said theoretical lift forces, calculating an angle of attack φ based on the fraction, and selecting a position for the anchor based on φ. Where property size does not allow an anchor attachment having an angle equal to φ, this embodiment is considered to read on an anchor positioned as close as possible to this position.

According to a still further embodiment of the present disclosure, $F_{maxlift}=F_{lift}-F_{gravity}$, where $F_{lift}$ is the absolute lift applied to said structure due to said estimate, and $F_{gravity}$ is the downward force due to the weight of the roof.

According to a still further embodiment of the present disclosure, the separation boundary is defined by a separation force ($F_{sep}$) based at least in part on the ultimate strength of a mechanical linkage between the structure and said intermediate structure.

According to a still further embodiment of the present disclosure, the method may further include calculating a net lift force ($F_{net}$) based on an absolute lift force ($F_{lift}$) applied to said structure by said wind energy and a downward force ($F_{gravity}$) applied by gravity where $F_{net}=F_{lift}-F_{gravity}$.

According to a still further embodiment of the present disclosure, the barrier may be oriented such that $F_{net}-F_{counter}<F_{sep}$.

According to a still further embodiment of the present disclosure, the method may further include attaching a second anchor to a fixed surface leeward of the structure, and connecting said tensioner between the barrier and said second anchor.

According to a still further embodiment of the present disclosure, the method may further include positioning a second semi-wind-permeable barrier between the tensioner and said second anchor.

According to a still further embodiment of the present disclosure, the method may further include determining a pre-tensioning force ($F_{pre}$) below a force sufficient to counteract $F_{net}$ where $F_{net}>F_{sep}$, and pre-tensioning the barrier to $F_{pre}$.

According to a still further embodiment of the present disclosure, the method may further include distributing a plurality of cables across a surface of said roof, attaching each of said plurality of cables to said tensioner.

According to a still further embodiment of the present disclosure, the method may further include determining a pre-tensioning force ($F_{pre}$) below a force sufficient to counteract $F_{maxlift}$, and pre-tensioning the barrier to $F_{pre}$.

According to a still further embodiment of the present disclosure, the method may further include determining a minimum $F_{minpre}$ sufficient to stabilize the orientation of the barrier in the absence of a wind energy, and pre-tensioning the barrier to $F_{pre}$, where $F_{minpre}<F_{pre}<F_{maxlift}$.

FIG. 1A discloses a dynamically balanced system 110 for counteracting storm damage due to aerodynamic lift including a structure 20, at least one tensioner 10 coupled to structure 20, an anchor 12 secured to a surface 35 separated from structure 20 by a weak-link boundary 60, and a wind energy collection foil 14 at least partially wind-permeable deployed as a force link between at least one tensioner 10 and anchor 12. The system functions such that collection foil 14 is oriented such that a wind (30, FIG. 1B) applied to the system results in a strain in collection foil 14, the strain producing a counterforce on at least one tensioner 10 the counterforce ($F_{counter}$) having at least a component opposite in direction to an aerodynamic lift induced in said structure by wind 30.

According to a further embodiment of the system of the present disclosure, the wind event is a predictable wind event.

According to a still further embodiment of the system of the present disclosure, the magnitude of $F_{counter}$ varies, at least in part, proportionally to said lift force.

According to a still further embodiment of the system of the present disclosure, structure 20 is a roof of a building 50.

According to a still further embodiment of the system of the present disclosure, the aerodynamic lift is a net lift force ($F_{net}$), the net lift force being calculated according to the formula $F_{net}=F_{lift}-F_{gravity}$ where $F_{lift}$ is the total aerodynamic lift on the roof, and $F_{gravity}$ is the weight of said roof, and wherein $F_{counter}$ is proportional to at least one of $F_{lift}$ and $F_{net}$.

According to a still further embodiment of the system of the present disclosure, the roof has a windward side and a leeward side dependent upon the application of said wind.

According to a still further embodiment of the system of the present disclosure, the at least one tensioner further includes a plurality of elongate members positioned across a surface of the roof, and connectors attached respectively between each of the elongate members, to function in such a manner that $F_{counter}$ is distributed among said elongate members.

According to a still further embodiment of the system of the present disclosure, the connectors are carabiners.

According to a still further embodiment of the system of the present disclosure, the elongate members are cables.

According to a still further embodiment of the system of the present disclosure, the elongate members are woven belts.

According to a still further embodiment of the system of the present disclosure, the system further includes at least one grommet provided in each of said belts, the grommets sized to receive at least one of said carabiners.

According to a still further embodiment of the system of the present disclosure, the at least one anchor is located windward of said structure.

According to a still further embodiment of the system of the present disclosure, the at least one anchor is embedded in a horizontal surface windward of said structure.

According to a still further embodiment of the system of the present disclosure, the horizontal surface is at grade level with the earth.

According to a still further embodiment of the system of the present disclosure, the at least one anchor is secured within soil.

According to a still further embodiment of the system of the present disclosure, the at least one anchor is a temporary stake.

According to a still further embodiment of the system of the present disclosure, the at least one anchor is embedded on a windward wall of said building.

According to a still further embodiment of the system of the present disclosure, the at least one anchor is a temporary fixture.

According to a still further embodiment of the system of the present disclosure, the system may further include a leeward anchor on the leeward side of said structure, such that the at least one tensioner is connected between said foil and the leeward anchor.

According to a still further embodiment of the system of the present disclosure, the wind event has an indefinite duration and said wind energy varies during said wind event.

According to a still further embodiment of the system of the present disclosure, the foil comprises a netted material.

According to a still further embodiment of the system of the present disclosure, the foil comprises a plurality of membranes.

According to a still further embodiment of the system of the present disclosure, the plurality of membranes are arranged such as to be separated by a gap.

According to a still further embodiment of the system of the present disclosure, the membranes are comprised individually of wind-impermeable material.

According to a still further embodiment of the system of the present disclosure, the foil includes a plurality of membranes respectively connected between at least one of said at least one anchor and at least one of said at least one tensioner.

According to a still further embodiment of the system of the present disclosure, the system may further include a separation boundary between the structure and an intermediate structure.

According to a still further embodiment of the system of the present disclosure, the structure is a roof of a building and the intermediate structure is a wall to which the roof is attached, the separation boundary being the interface between the roof and said wall.

According to a still further embodiment of the system of the present disclosure, the roof has a windward pitch defined by an angle p from horizontal.

According to a still further embodiment of the system of the present disclosure, the anchor is located on a windward wall.

According to a still further embodiment of the system of the present disclosure, the at least one anchor is affixed to a horizontal surface windward of said building.

According to a still further embodiment of the system of the present disclosure, the at least one anchor is positioned a distance (d) such that an angle ($\phi$) between said horizontal surface and said foil is less than 90 degrees.

According to a still further embodiment of the system of the present disclosure, the angle ($\phi$) is greater than the angle ($\rho$).

According to a still further embodiment of the system of the present disclosure, the netted material is configured to withstand flying debris.

According to a still further embodiment of the system of the present disclosure, the foil is pre-tensioned to force ($F_{pre}$), at least sufficient to hold said foil in place relative to said structure when wind is absent.

According to a still further embodiment of the system of the present disclosure, the wind event is a predictable wind event.

According to a still further embodiment of the system of the present disclosure, at least a component of the strain in the at least one tensioner produces a counterforce ($F_{counter}$) opposed in direction to said lift force.

According to a still further embodiment of the system of the present disclosure, the lift force is a net lift force ($F_{net}$), the net lift force being calculated according to the formula $F_{net}=F_{lift}-F_{gravity}$ where $F_{lift}$ is the total aerodynamic lift on said roof, and $F_{gravity}$ is the opposing force produced by the weight of said roof, and wherein $F_{counter}$ is proportional to at least one of $F_{net}$ and $F_{lift}$.

According to a still further embodiment of the system of the present disclosure, an edge of the structure is defined by a separation boundary between the structure and an intermediate structure, the structure being separable from the intermediate structure at said separation boundary when the net lift force $F_{net}$ is greater than a separation force ($F_{sep}$).

According to a still further embodiment of the system of the present disclosure, $F_{sep}$ is defined at least in part by the ultimate strength of a mechanical linkage between the structure and said intermediate structure.

According to a still further embodiment of the system of the present disclosure, force ($F_{pre}$) is insufficient to counteract said net lift force $F_{net}$ when $F_{net}>F_{sep}$.

According to a still further embodiment of the system of the present disclosure, $F_{net}-F_{counter}<F_{sep}$.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims, and all changes which come within the meaning and range of equivalency of the claims are therefore intended to be embraced.

What is claimed is:

1. A loss prevention device for a structure subject to aerodynamic lift upon exposure to a wind event, comprising:
   at least one tensioner coupled to said structure,
   at least one anchor attached to a fixed surface, and
   at least one barrier semipermeable to airflow connected between the at least one anchor and the at least one tensioner and exposed to said wind event,
   wherein a fraction of a wind energy of said wind event is divided between the structure and the barrier, such that a lift force induced in the structure by the wind energy is at least partially counteracted by a strain induced in the barrier by said wind energy;
   wherein at least a component of the strain induced produces a counterforce ($F_{counter}$) on the at least one tensioner which is opposed in direction to said lift force and is substantially proportional to said lift force.

2. The device of claim 1 wherein the structure is a roof of a building.

3. The device of claim 2 wherein said lift force is a net lift force ($F_{net}$), the net lift force being calculated according to the formula $F_{net}=F_{lift}-F_{gravity}$, where $F_{lift}$ is the total aerodynamic lift on said roof, and $F_{gravity}$ is the force due to the weight of said roof, and wherein $F_{counter}$ is proportional to at least one of $F_{lift}$ and $F_{net}$.

4. The device of claim 2 wherein the at least one tensioner further comprises:
   a plurality of elongate members positioned across a surface of the roof, and
   connectors attached respectively between each of the elongate members,
   wherein said counterforce is distributed among said elongate members.

5. The device of claim 1 wherein the barrier comprises a netted material.

6. The device of claim 5 wherein said netted material is configured to withstand flying debris.

7. The device of claim 1 wherein the barrier comprises a plurality of membranes.

8. The device of claim 7 wherein said plurality of membranes are arranged to be separated by a gap.

9. The device of claim 1 wherein said barrier is pre-tensioned to force ($F_{pre}$), at least sufficient to hold said barrier in place relative to said structure when wind energy is zero.

10. The device of claim 9 wherein said wind event is a predictable wind event.

11. The device of claim 10 wherein said lift force is a net lift force ($F_{net}$), the net lift force being calculated according to the formula $F_{net}=F_{lift}-F_{gravity}$ where $F_{lift}$ is the total aerodynamic lift on said roof, and $F_{gravity}$ is the opposing force produced by the weight of said roof, and wherein $F_{counter}$ is proportional, over at least a range of wind conditions, to at least one of $F_{net}$ and $F_{lift}$.

12. The device of claim 11 wherein an edge of the structure is defined by a separation boundary between the structure and an intermediate structure, the structure being separable from the intermediate structure at said separation boundary when the net lift force $F_{net}$ is greater than a separation force ($F_{sep}$).

13. The device of claim 12 wherein $F_{sep}$ is defined at least in part by the ultimate strength of a mechanical linkage between the structure and said intermediate structure.

14. The device of claim 13 wherein the force ($F_{pre}$) is insufficient to counteract said net lift force $F_{net}$ when $F_{net}>F_{sep}$.

15. The device of claim 14 wherein $F_{net} - F_{counter} < F_{sep}$.

16. A method for counteracting aerodynamic lift in a structure during a wind event, comprising:
- attaching a tensioner to said structure,
- attaching an anchor to a fixed surface windward of the structure,
- positioning a semi-wind-permeable barrier, attached between the tensioner and the anchor, in the path of said wind event,
- orienting the barrier such that a first fraction of a wind energy of the wind event induces a strain in the barrier resulting in a force applied to said tensioner, and
- directing at least a component of said force to provide a counterforce ($F_{counter}$) in a direction opposed to said aerodynamic lift, the aerodynamic lift resulting from a second fraction of said wind energy acting on said structure;
- wherein the $F_{counter}$ is substantially proportional to the aerodynamic lift.

17. A dynamically balanced system for counteracting storm damage due to aerodynamic lift comprising:
- a structure,
- at least one tensioner coupled to the structure,
- an anchor secured to a surface separated from the structure by a weak-link boundary, and
- a wind energy collection foil at least partially wind-permeable deployed as a force link between the at least one tensioner and the anchor,
- wherein the collection foil is oriented such that a wind applied to the system results in a strain in the foil, at least a component of the strain producing a counterforce ($F_{counter}$) on the at least one tensioner, the $F_{counter}$ having at least a component opposite in direction of an aerodynamic lift induced in said structure by the wind,
- wherein the $F_{counter}$ is substantially proportional to the aerodynamic lift.

* * * * *